United States Patent
Stahl et al.

(10) Patent No.: US 12,424,215 B2
(45) Date of Patent: Sep. 23, 2025

(54) PRE-WAKEWORD SPEECH PROCESSING WITH REVERSE AUTOMATIC SPEECH RECOGNITION

(71) Applicant: SoundHound, Inc., Santa Clara, CA (US)

(72) Inventors: Karl Stahl, Boca Raton, FL (US); Bernard Mont-Reynaud, Santa Clara, CA (US)

(73) Assignee: SoundHound AI IP, LLC., Santa Clara, CA (US)

( * ) Notice: Subject to any disclaimer, the term of this patent is extended or adjusted under 35 U.S.C. 154(b) by 428 days.

(21) Appl. No.: 17/804,544

(22) Filed: May 27, 2022

(65) Prior Publication Data

US 2023/0386458 A1    Nov. 30, 2023

(51) Int. Cl.
*G10L 15/22* (2006.01)
*G10L 15/05* (2013.01)
*G10L 15/08* (2006.01)
*G10L 25/93* (2013.01)

(52) U.S. Cl.
CPC .............. *G10L 15/22* (2013.01); *G10L 15/08* (2013.01); *G10L 25/93* (2013.01); *G10L 2015/088* (2013.01)

(58) Field of Classification Search
CPC ..... G10L 15/04; G10L 15/05; G10L 15/1822; G10L 15/183; G10L 15/22; G10L 2015/025; G10L 2015/088; G10L 2015/223
USPC .......................... 704/251, 253, 255, 270, 275
See application file for complete search history.

(56) References Cited

U.S. PATENT DOCUMENTS

| | | | |
|---|---|---|---|
| 9,275,637 B1* | 3/2016 | Salvador | G10L 15/06 |
| 9,548,053 B1* | 1/2017 | Basye | G10L 15/22 |
| 10,978,074 B1* | 4/2021 | Roy | G10L 15/16 |
| 11,521,599 B1* | 12/2022 | Jose | G10L 15/16 |
| 2003/0074195 A1* | 4/2003 | Bartosik | G10L 15/22 704/235 |
| 2007/0078642 A1* | 4/2007 | Weng | G10L 15/1822 704/4 |
| 2007/0233485 A1* | 10/2007 | Hitotsumatsu | G10L 15/08 704/251 |
| 2011/0040554 A1* | 2/2011 | Audhkhasi | G10L 15/26 704/235 |
| 2011/0131043 A1* | 6/2011 | Adachi | G10L 15/08 704/246 |
| 2011/0288862 A1* | 11/2011 | Todic | G10L 15/05 704/235 |

(Continued)

*Primary Examiner* — Martin Lerner
(74) *Attorney, Agent, or Firm* — Platinum Intellectual Property PC

(57) ABSTRACT

Methods and systems for pre-wakeword speech processing are disclosed. Speech audio, comprising command speech spoken before a wakeword, may be stored in a buffer in oldest to newest order. Upon detection of the wakeword, reverse acoustic models and language models, such as reverse automatic speech recognition (R-ASR) can be applied to the buffered audio, in newest to oldest order, starting from before the wakeword. The speech is converted into a sequence of words. Natural language grammar models, such as natural language understanding (NLU), can be applied to match the sequence of words to a complete command, the complete command being associated with invoking a computer operation.

20 Claims, 11 Drawing Sheets

(56) References Cited

U.S. PATENT DOCUMENTS

| | | | |
|---|---|---|---|
| 2012/0095766 A1* | 4/2012 | Han | G10L 15/197 |
| | | | 704/255 |
| 2014/0214429 A1 | 7/2014 | Pantel | |
| 2015/0170652 A1* | 6/2015 | Kaplan | G10L 15/22 |
| | | | 704/246 |
| 2019/0156818 A1 | 5/2019 | Piersol et al. | |
| 2019/0318731 A1* | 10/2019 | Jost | G10L 15/05 |
| 2019/0325898 A1* | 10/2019 | O'Hart Kinney | G10L 25/78 |
| 2019/0371332 A1* | 12/2019 | Yu | G10L 15/22 |
| 2021/0074264 A1* | 3/2021 | Liang | G10L 15/28 |
| 2021/0097990 A1* | 4/2021 | Kim | G10L 15/1822 |
| 2021/0142786 A1* | 5/2021 | Shim | G10L 15/22 |

\* cited by examiner

300

Forward Phonetic Dictionary

| Word | Forward Pronunciation (Forward Token Translation) |
|---|---|
| a | EY |
| abandon | AH B AE N D AH N |
| ability | AH B IH L IH T IY |
| able | EY B E L |
| about | AH B AW T |
| above | AH B AH V |
| abroad | AH B R AA D |
| absence | AE B S EH N S |
| allowance | AH L AW EH N S |
| ... | ... |
| ... | ... |
| ... | ... |

Reverse Phonetic Dictionary

| Word | Reverse Pronunciation (Reverse Token Translation) |
|---|---|
| a | EY |
| abandon | N AH D N AE B AH |
| ability | IY T IH L IH B AH |
| able | L E B EY |
| about | T AW B AH |
| above | V AH B AH |
| abroad | D AA R B AH |
| absence | S N EH S B AE |
| allowance | S N EH AW L AH |
| ... | ... |
| ... | ... |
| ... | ... |

FIG. 3B

PRE-WAKEWORD SPEECH PROCESSING WITH REVERSE AUTOMATIC SPEECH RECOGNITION

TECHNICAL FIELD

The present subject matter is in the field of artificial intelligence systems and wakeword command processing. More particularly, embodiments of the present subject matter relate to methods and systems for recognizing commands uttered before a wakeword.

BACKGROUND

To process a command or query, conventional voice virtual assistants often require a particular speech order. Specifically, they can require saying a wakeword, such as the name of the assistant, before saying the command. A wakeword spotter may detect speech comprising the assistant name, followed by performing a wake-up routine to begin capturing speech following the wakeword and processing a command found in the post-wakeword speech. However, it is important to also be able to recognize commands when the commands are spoken in a natural manner, which might not always conform with the speech order required by conventional virtual assistants. Many times, when making a command or query, it is more natural to utter the command or query before the wakeword. For example, this may be due to a preference or speaking style of the speaker. In another example, the command or query may be uttered in a situation where it is more natural to name the addressee (e.g., wakeword) after stating the command or query. For example, in certain situations, it would be more natural to utter, "Bring me a water, Houndify," where "bring me a water" is the command and "Houndify" is the addressee.

Some conventional virtual assistants do buffer some audio prior to the wakeword (e.g., pre-wakeword speech), but not without limitations. Finding the beginning of a command within pre-wakeword speech can result in inadvertently capturing and/or processing speech prior to the actual command (e.g., pre-command speech). For example, a traditional approach to buffering pre-wakeword audio is to store a particular number of seconds of audio before the wakeword, then process the audio from beginning to end, scanning for possible silence just before the command. An ideal speech input for this approach may comprise a period of silence, followed by the query, "what's the weather, Houndify?" However, not all commands are guaranteed to follow a noticeable period of silence. Some commands may even be immediately preceded by additional non-command related speech.

It is thus desired to improve the capabilities and efficiency of virtual assistants in recognizing a command spoken before a wakeword.

SUMMARY

The following specification describes many aspects of recognizing a command spoken before a wakeword. Some examples are systems of process steps or systems of machine components for recognizing and processing pre-wakeword speech. These can be implemented with computers that execute software instructions stored on non-transitory computer-readable media.

The present subject matter describes improved approaches for recognizing a command which precedes a wakeword. In particular, approaches for detecting a wakeword within speech audio and performing speech recognition and natural language understanding in reverse on the speech audio are described. To implement the methods of the present subject matter, the system can receive speech audio comprising command speech and a wakeword, the command speech spoken before the wakeword. The speech audio may be stored in a buffer in oldest to newest order. Upon detection of the wakeword, reverse acoustic models, such as reverse automatic speech recognition (R-ASR) can be applied to the buffered audio, in newest to oldest order, starting from before the wakeword. The speech is converted into a sequence of words, according to ASR functionality. This sequence of words can be matched to a complete command, according to NLU functionality. A complete command may comprise a plurality of words matching a grammar which corresponds to a computer command or request to invoke a function (e.g., an instruction to a computer program to perform a specific task or operation). The computer command may include queries to a computer program. Running R-ASR on the buffered audio in reverse order starting from the wakeword eliminates the need for continuous voice activity detection (VAD) of a command in the speech audio, reducing power consumption and unnecessary delays in system responses to spoken commands.

When speaking, it can be natural (for example, syntactically, semantically, based on situational circumstances, etc.) to intersperse command speech with non-command speech. The present invention can distinguish between command speech and non-command speech, such as when analyzing combined command speech and non-command speech stored in a buffer. For example, buffers need to be large enough to store the longest recognized commands, spoken at the slowest possible rate. But shorter commands, or commands that are spoken quickly, may require less storage and be preceded by additional buffered audio which comprises non-command speech. The present invention can distinguish and process the command separately from the non-command speech (e.g., avoiding combining the non-command speech with the actual command), thereby preventing a false negative match to a natural language understanding (NLU) grammar. That is, the present invention can recognize a legitimate command that was buried within non-command speech.

Buffered pre-command speech (e.g., non-command speech which precedes a command) may include speech which can be recognized as part of a command, but is uttered before the actual command. Because the present invention can distinguish command speech which is interspersed with non-command speech in the buffer, it can also prevent false positive matches to grammar (e.g., processing the pre-command as a true command before ever reaching the actual command speech). For example, the present invention can process the actual command speech in newest to oldest order using R-ASR, which prevents reaching and processing the pre-command speech at all.

It can also be difficult to distinguish a non-command (specifically, a canceled command) from mid-sentence corrections. In some cases, an initial command may be uttered, followed by a mid-sentence correction which requests a function associated with a different command. As the present invention processes utterances in newest to oldest order from the wakeword, it can recognize and process the correction as the true command before ever reaching the initial, incorrect command speech. Therefore, the present invention prevents inadvertently processing the initial incorrect command before realizing a correction was made afterword.

The present invention reduces power consumption by eliminating the need for running continuous voice activity detection (VAD) to mark buffer locations of pauses (e.g., pinpointing times of no voice activity). This allows the present invention to reduce the number of continuous processes to a single continuous wakeword spotter, which is less prone to errors, less time consuming, and less power consuming. VAD may be used to recognize periods of voice activity and non-voice activity (e.g., pauses) and mark points in the buffer where voice activity begins or ends. Upon detecting the wakeword, audio can be processed from the latest point in the buffer at which voice activity begins. However, voice activity points are only hypotheses. They are prone to error, especially when users naturally speak at different rates. By eliminating VAD, the present invention prevents false positive hypothesis for a start of voice activity. Thus, the present invention ensures that the beginning of a command would not be missed.

In accordance with one aspect of the present disclosure, there is a method of recognizing a command spoken before a wakeword, the method comprising: receiving an audio signal comprising speech; storing the audio signal in a sequence of spectral frames in a buffer; detecting a wakeword in the audio signal; estimating an initial frame of the wakeword; converting a plurality of frames into a sequence of words using reverse automatic speech recognition (R-ASR), in newest to oldest order, beginning from a first frame before the wakeword initial frame; matching the sequence of words to a complete command; and invoking a function associated with the complete command. Using R-ASR can reference at least a phonetic dictionary, the phonetic dictionary having reverse pronunciations of words. Furthermore, the audio signal can be transformed into a sequence of reversed phonemes through R-ASR prior to being converted into the sequence of words. Using R-ASR can further reference at least a language model, the language model having reverse orders of word sequences. According to some embodiments, converting the audio signal into the sequence of words terminates when the sequence of words matches a complete command.

According to some embodiments, the method of recognizing a command spoken before the wakeword further comprises estimating a last frame of the wakeword; converting a second plurality of spectral frames into a second sequence of words using (forward) automatic speech recognition (ASR) system, in oldest to newest order, beginning from a first frame after the last frame of the wakeword; combining the sequence of words and the second sequence of words into a combined sequence of words; matching the combined sequence of words to the complete command; and invoking the function associated with the complete command.

According to some embodiments, using ASR comprises referencing at a second phonetic dictionary, the second phonetic dictionary having forward pronunciations of words. Using ASR can further comprise referencing at least a second language model, the second language model having forward orders of word sequences. Converting the plurality of frames using R-ASR and converting the second plurality of frames using ASR can be performed in separate simultaneous threads. Further, converting the plurality of spectral frames using R-ASR can be performed on a high-performance processor while converting the second plurality of spectral frames using ASR can be performed on a low-performance processor.

According to some embodiments, the method of recognizing a command spoken before the wakeword further comprises identifying a mid-sentence correction between the command and the wakeword, the mid-sentence correction corresponding to words matching a second complete command; and invoking a function associated with the second complete command.

According to some embodiments, the method of recognizing a command spoken before the wakeword further comprises detecting a pause in the audio signal, and converting the plurality of frames using R-ASR, in newest to oldest order, beginning from the first frame before the initial frame of the wakeword toward the pause. Furthermore, the wakeword can be one of a high frequency phrase.

According to some embodiments, a method of recognizing a command comprises receiving an audio signal comprising speech; detecting a wakeword in the audio signal; estimating a beginning time of the wakeword; converting the audio signal into a sequence of words using reverse automatic speech recognition (R-ASR), in newest to oldest order, from before the beginning time of the wakeword; and invoking a function associated with the sequence of words.

According to some embodiments, there is a method for recognizing a command spoken before a wakeword, the method comprising: receiving an audio signal comprising speech; storing the audio signal in a buffer; detecting a wakeword in the audio signal; detecting a pause before the wakeword, using reverse voice activity detection (R-VAD) in newest to oldest order; transforming the audio signal from the pause into a sequence of words using forward automatic speech recognition (ASR), in oldest to newest order; and invoking a function associated with the sequence of words. According to some embodiments, the method can further comprise detecting a second pause in the audio signal after the wakeword; discarding the wakeword; and terminating the ASR at the second pause.

Other aspects and advantages of the present subject matter will become apparent from the following detailed description taken in conjunction with the accompanying drawings, which illustrate, by way of example, the principles of the present subject matter.

BRIEF DESCRIPTION OF THE DRAWINGS

FIG. 3A shows an exemplary forward pronunciation dictionary based on the Carnegie Mellon University's standard phoneme codes, according to one or more embodiments of the present subject matter;

FIG. 3B shows an exemplary reverse pronunciation dictionary based on the Carnegie Mellon University's standard phoneme codes, according to one or more embodiments of the present subject matter;

DETAILED DESCRIPTION

The present subject matter pertains to improved approaches for a pre-wakeword speech processing system. Embodiments of the present subject matter are discussed below with reference to FIGS. 1-9.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for processing pre-wakeword speech and their applications. These can be implemented with computers that execute software instructions stored on non-transitory computer-readable media. An improved pre-wakeword speech processing system can have one or more of the features described below.

Figure 1:
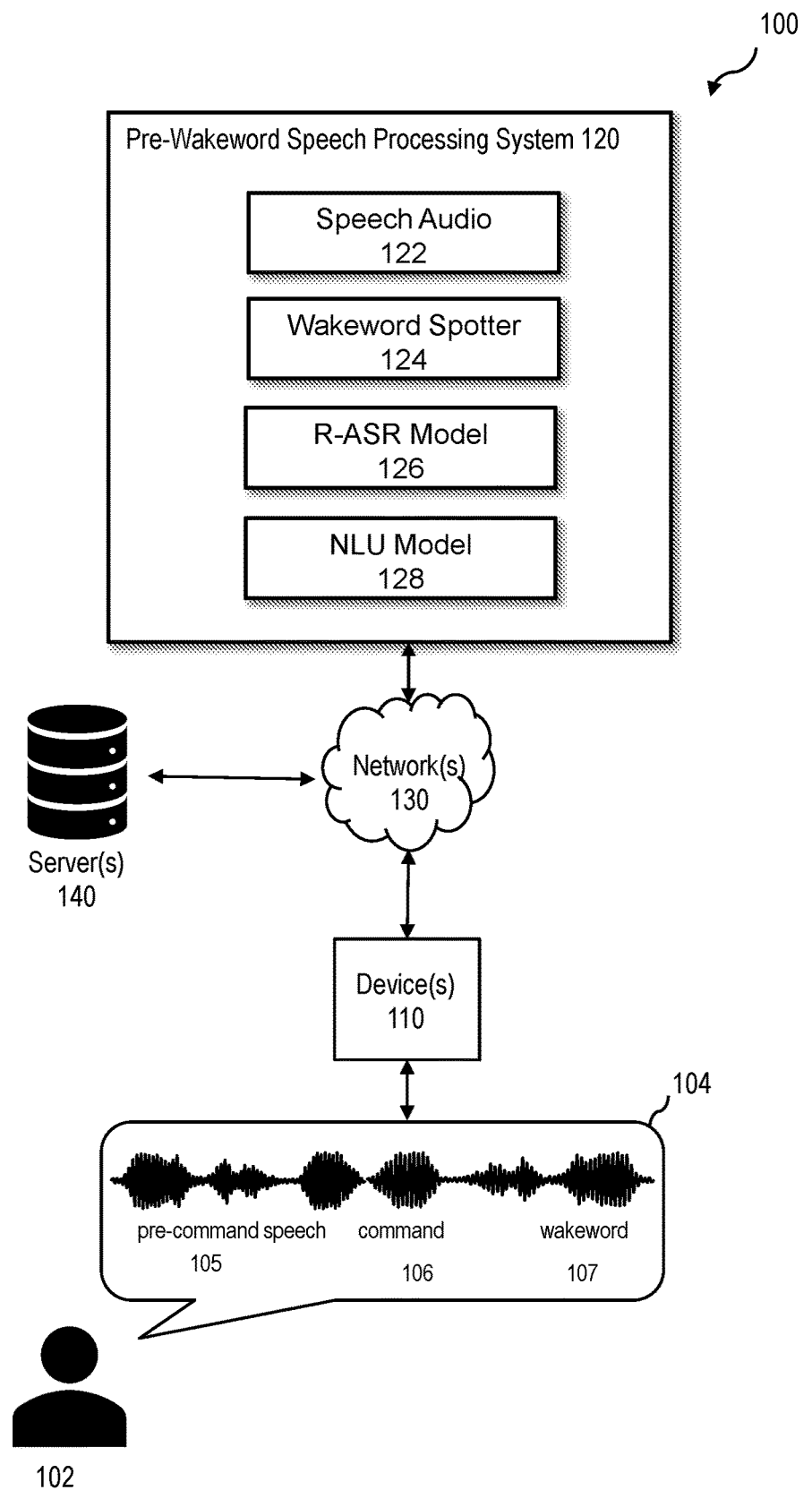
FIG. 1 shows an exemplary diagram of a pre-wakeword processing system, according to one or more embodiments of the present subject matter.

FIG. 1 shows an example diagram 100 of a pre-wakeword processing system, in accordance with various embodiments. In the example, a command is spoken before a wakeword. A user 102 utters a set of spoken words 104 comprising pre-command speech 105, followed by command 106, which in turn is followed by a wakeword 107. Wakeword 107 activates a virtual assistant and may be a designated word or phrase. In an embodiment, wakeword 107 may comprise a high frequency phrase, the phrase being a single word or a plurality of words. For example, a wakeword may be considered a high frequency phrase or word (e.g., a high frequency launch word) if it is repeated over a threshold number of times over a predetermined period of time and/or is associated with a command (e.g., spoken closely following or preceding a command). Pre-wakeword speech includes spoken words before the wakeword 107 (e.g., pre-command speech 105 and command 106). Command 106 (also referred to as command speech) can correspond to a computer command or a request to invoke a function (e.g., an instruction to a computer program to perform a specific task or operation). Pre-command speech 105 may include speech which precedes the command 106 but is not part of the command (e.g., pre-command speech comprises non-command speech).

Device 110 may provide a voice user interface for a virtual assistant. The voice user interface provided by device 110 allows a user to command or query the virtual assistant (e.g., spoken set of words 104 can be received by device 110). Device 110 may comprise a range of computing devices, including embedded devices (e.g., processing resources within electronic circuitry that are located within a non-computing devices). Device 110 may comprise a voice-controlled device, further comprising one or more microphones and an audio pre-processor. As examples, a device 110 may comprise a home assistant, a personal computing device, a wearable device, a motor vehicle, among others. These examples are not limiting (e.g., client devices may alternatively comprise "smart" appliances such as refrigerators and televisions, security equipment, restaurant ordering stations, vending machines, desktop and office computing devices, cameras, and robotic devices). A device 110 that is a home assistant may comprise an audio device for use in the home. A device 110 that is a personal computing device may comprise a cellular communications device and/or a wireless networking device. The personal computing device may comprise a smartphone, tablet, laptop, or desktop device. A device that is a wearable device may comprise a smart watch, head-mounted user interface devices, earpieces, wearable fitness trackers, smart clothing with embedded circuitry, and the like. A device 110 that is a motor vehicle may comprise a vehicle embedded with a client device within the vehicle control system.

In the example 100 of FIG. 1, device 110 may be communicatively coupled to a server 140 over one or more networks 130. The one or more networks 130 may comprise one or more local and/or wide area networks that may be implemented using a variety of physical technologies (e.g., wired technologies such as Ethernet and/or wireless technologies such as Wi-Fi—IEEE 802.11—standards and cellular communications technologies). In certain cases, the one or more networks 130 can comprise a single network or a combination of multiple networks, such as the Internet or intranets, wireless cellular networks, local area network (LAN), wide area network (WAN), WiFi, Bluetooth, near-field communication (NFC), etc. Network 130 can comprise a mixture of private and public networks, or one or more local area networks (LANs) and wide-area networks (WANs) that may be implemented by various technologies and standards.

The device 110 and server 140 may communicate over the network using different technologies and communication pathways. The server 140 may comprise a computing device with one or more central processing units and/or graphical processing units and a memory resource.

According to some embodiments, pre-wakeword speech processing system 120 can capture soundwave recording of the set of spoken words 104, for example via device 110. Upon receiving the soundwave recording pre-wakeword speech processing system 120 can generate speech audio 122 based on the set of spoken words 104. Speech audio 122 (e.g., audio data) can comprise time-series measurements, such as time series pressure fluctuation measurements and/or time series frequency measurements. For example, one or more channels of Pulse Code Modulation (PCM) data may be captured at a predefined sampling rate where samples are represented by a predefined number of bits. Audio data may be processed following capture, for example, by filtering in one or more of the time and frequency domains, by applying beamforming and noise reduction, and/or by filtering and normalization. In one case, audio data may be converted into measurements over time in the frequency domain by performing the Fast Fourier Transform to create one or more frames of spectrogram data. According to some embodiments, filter banks may be applied to determine values for one or more frequency domain features, such as Mel-Frequency Cepstral Coefficients. Speech audio 122 as described herein for speech recognition, may comprise a measurement made within an audio processing pipeline.

According to some embodiments, speech audio 122 (e.g., the audio signal of the set of spoken words 104) is stored in a buffer from oldest to newest order. According to some embodiments, wakeword spotter 124 can identify the time at which wakeword 107 began being spoken. Audio in the buffer after that point in time comprises wakeword 107, not the command, and therefore need not be processed, which can save on further processing and energy.

When a wakeword occurs, the audio for some or all of the pre-wakeword speech would be processed, requiring processing power. According to some embodiments, wakeword spotter 124 may spot for keywords other than the wakeword. For example, wakeword spotter 124 can spot words of high frequency (e.g., a high frequency phrase or launch word.). In another example, wakeword spotter 124 can detect, using named-entity detection, for an inquiry word from speech structures which follow specific grammars, such as "get" and "weather" from speech comprising the words, "Get me the weather forecast for San Francisco today." Other examples of inquiry words from named-entity detection may include "what" (such as in "what time is it in San Francisco right now?"), "how" (such as in "how many people live in San Francisco?"), "when" (such as in "when is Mother's Day?"), and so forth. According to some embodiments, wakeword spotter 124 may be a low accuracy, low power spotter (e.g., run on a low power processor). When wakeword spotter 124 detects a wakeword, or a possible wakeword, a higher power and/or higher accuracy wakeword spotter may review the possible wakeword and confirm detection of the wakeword. This can mitigate power consumption concerns for systems with low computing performance, where processing pre-wakeword audio (e.g., pre-wakeword speech) could result in performance delays, particularly when processing long commands.

Forward automatic speech recognition (ASR) converts audio data, from oldest to newest from the buffer, into a (forward) sequence of words. Forward ASR can be an acoustic model in connection with pronunciation models (e.g., a phonetic dictionary) and statistical language models for transcribing audio into text. The acoustic model may be a statistical model that is based on hidden Markov models and/or neural network models, which infer the probabilities of phonemes in the audio. Examples of such acoustic models comprise convolutional neural network (CNN) and recurrent neural network (RNN). In some examples, an acoustic model is trained on audio waveform samples as input. In some examples, an acoustic model is trained on frequency power spectrograms computed from overlapping frames of audio samples.

The forward sequence of words could then be subject to further calculations, for example, natural language understanding (NLU) models which can match the sequence of words to a complete command. A complete command can comprise a word sequence corresponding to a grammar associated with invoking a computer command (e.g., an instruction to a computer program to perform an operation). However, converting audio data using forward ASR to identify the command is limited when the command occurs before the wakeword. Voice activity detection (VAD) may be required starting from some time before the command, which such time can also be difficult to ascertain. Running continuous VAD on buffered audio is also power consuming. According to some embodiments, reverse-automatic speech recognition (R-ASR) model 126 transcribes speech audio 122 into a sequence of (reversed) words, in newest to oldest order, starting from before the beginning of the wakeword 107. Using R-ASR avoids the need for continuous VAD on buffered audio.

According to some embodiments, R-ASR model 126 converts frames of the buffered speech audio 122, from newest to oldest frames, into a sequence of phonemes (e.g., which correspond to a sequence of reversed words). Acoustic models can be applied to compute phoneme probabilities. Statistical language models (SLM) can be applied to N-grams in oldest to newest order. In another embodiment, reverse SLM can be applied to N-grams in newest to oldest order. According to some embodiments, a reverse phonetic dictionary (e.g., a reverse pronunciation dictionary, as described in FIG. 3B) may be referenced by R-ASR model 126, representing phoneme sequences for words in last to first phoneme order for purposes of phoneme sequence tokenization.

For example, with forward ASR, the buffered audio is dissected, from oldest to newest order, into a forward sequence of phonemes, and the sequence of phonemes are converted into a forward sequence of words based on which words are most statistically probable. For example, speech audio comprising the words, "bring me a water, Houndify" can be buffered, and forward ASR can be applied to the buffered audio from oldest to newest frame, and convert the audio into a forward sequence of phonemes, "B R IH N G M IY AH W AA T ER HH AW N D IH F AY". The sequence of phonemes can then statistically be converted into the text, "bring me a water Houndify". In contrast, with R-ASR, the buffered audio is converted into a reverse sequence of phonemes, starting from the newest frame to oldest frame in the buffer. Thus, the resulting reverse sequence of phonemes would comprise, "AY F IH D N AW HH ER T AA W AH IY M G N IH R B". A reverse phonetic dictionary (such as that shown in FIG. 3B) may be referenced, e.g., with statistical language models, to determine the most probable sequence of reverse words from the reverse sequence of phonemes. For example, a reverse phonetic dictionary may define the reverse phoneme sequence "ER T AA W" as corresponding to the reverse pronunciation of the word "water". The forward phonemes converted from the buffered audio by ASR can be compared (e.g., in newest to oldest order, beginning from a first frame before the wakeword initial frame) with words in the reverse phonetic dictionary to determine the most probable sequence of words. Thus, in this example, the reverse sequence of phonemes is compared to words referenced in the reverse phonetic dictionary and converted into a reverse sequence of words, for example, "water a me bring."

According to some embodiments, NLU model 128 identifies and infers the meaning of a command from the sequence of words. According to some embodiments, textual transcriptions from the R-ASR model 126 or phoneme probabilities can be further subject to natural language processing based on grammars or neural models to determine their semantic meanings. Natural language grammar models can be used for NLU. Accordingly, based on the inferred semantic meanings of the tokenized phoneme sequence, a response or action (e.g., a computer command) can be determined or performed in response. For example, NLU may be applied to match the reverse sequence of words, "water a me bring" with a reverse grammar and recognize that the command is a complete command (e.g., request) to bring the user a water. In another example, the reverse sequence of words may be reversed, (e.g., to "bring me a water") and forward NLU may be applied to match the words with a forward grammar to recognize the command.

Figure 2A:
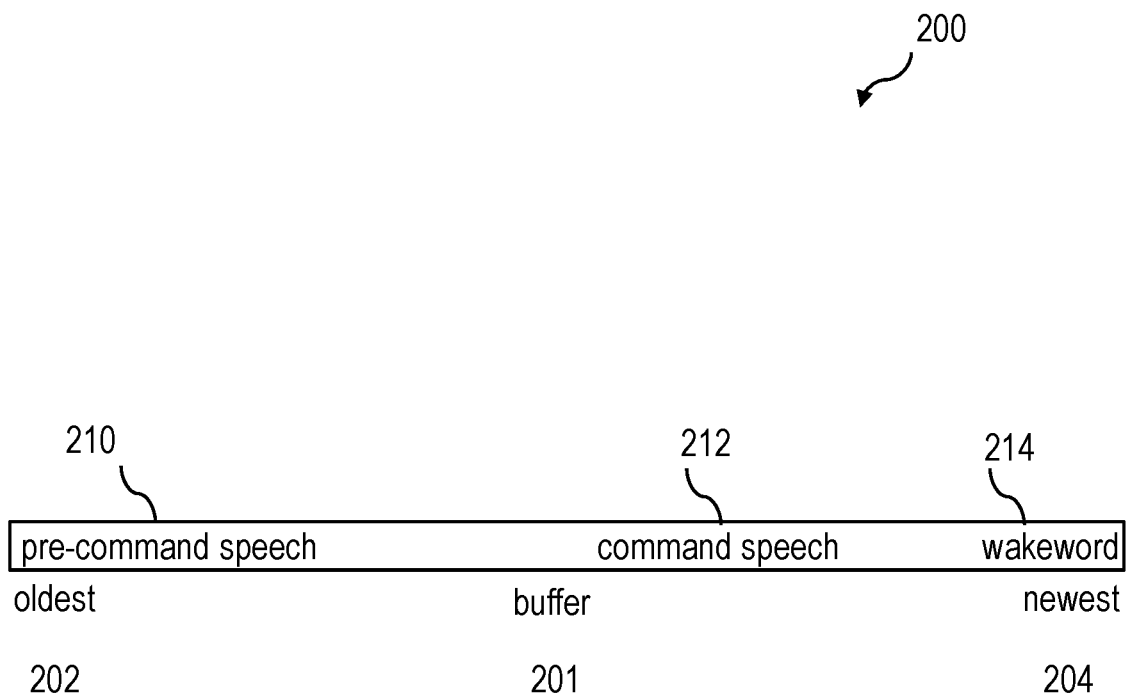
FIG. 2A shows an exemplary diagram of speech audio stored in a buffer, according to one or more embodiments of the present subject matter.

FIG. 2A shows an example 200 diagram of speech audio stored in a buffer 201, in accordance with various embodiments. It should be noted that although the buffer 201 in the example is illustrated as a linear buffer beginning from the left and progressing to the right, it is a logical representation of a buffer, rather than a physical representation. Thus, according to some embodiments, the buffer 201 is a circular buffer (e.g., a circular buffer of data stored in a RAM with a write pointer that increments and wraps around). Speech audio, (e.g., audio signal comprising pre-command speech 210, command speech 212, and wakeword 214) is stored in the buffer from oldest 202 to newest 204 order. In the example, pre-command speech 210 is stored closer to the oldest 202 end, followed by command speech 212, followed by the wakeword 214 stored closer to the newest 204 end. According to some embodiments, the speech audio is transcribed into a sequence of reversed words through R-ASR, starting from before wakeword 214 and through the speech audio in a direction from newest 204 toward the oldest 202 ends. Upon transcribing and recognizing command speech 212, the remainder of the speech audio (e.g., pre-command speech 210) is ignored and not processed.

Captured speech audio is maintained in the buffer 201 and older portions of the speech audio can be discarded and/or replaced by incoming audio over time. According to some embodiments, the buffer 201 is large enough to store a command of maximum length spoken at a minimum speed.

According to some embodiments, the speech audio is converted and stored as spectral frames (e.g., Mel-spectrogram frequency domain spectral frames). Speech audio data may be converted into measurements over time in the frequency domain by performing the Fast Fourier Transform to create one or more frames of spectrogram data. According to some embodiments, filter banks may be applied to determine values for one or more frequency domain features, such as Mel-Frequency Cepstral Coefficients. According to some embodiments, the speech audio can be stored as time domain samples prior to converting to frequency domain spectral frames.

Figure 2B:
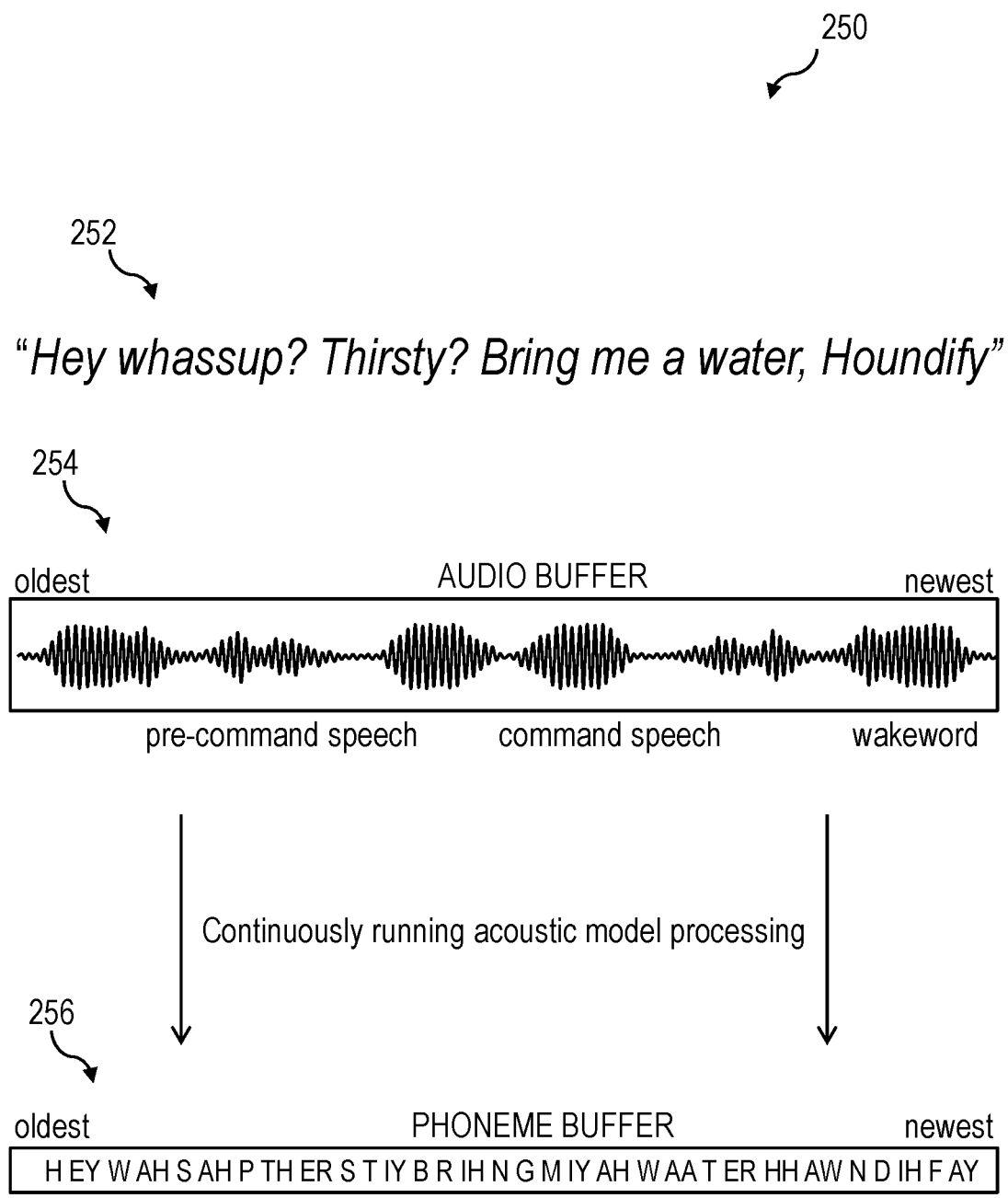
FIG. 2B shows another exemplary diagram of speech audio stored in a buffer, according to one or more embodiments of the present subject matter.

FIG. 2B shows an example 250 diagram of an audio buffer and corresponding phoneme buffer, in accordance with various embodiments. According to some embodiments, a set of spoken words 252 is stored in an audio buffer 254 from oldest to newest order. In particular, the pre-wakeword speech (e.g., comprising pre-command speech and command speech) are stored first, followed by the wakeword. A wakeword spotter can detect the wakeword. An initial frame of the wakeword may be estimated. In the example, "Houndify" is the wakeword, and the wakeword initial frame would be the frame which includes the first phoneme of the wakeword, "HH". Thus, the wakeword initial frame can be just after the command ends, e.g., the frame which includes "ER" in "water". The buffered audio is transcribed (e.g., into a sequence of phonemes) using R-ASR starting from the wakeword initial frame, from newest to oldest order. For example, the transcription starts from before the frame comprising "HH" in "Houndify" and toward the pre-wakeword speech (e.g., working backward through each word in the audio, "water", "a", "me", "bring", etc.). The transcription may produce an intermediary sequence of reversed phonemes (e.g., of words in reverse order). In the example, the sequence of reverse phonemes could comprise the phonemes for the command, "Bring me a water" in reverse (e.g., "ER T AA W AH IY M G N IH R B"). The sequence of reversed phonemes may be stored, from newest to oldest order, in a phoneme buffer 256. The reversed phonemes may be recognized as phonemes of words found in a phoneme-reversed pronunciation dictionary (e.g., see FIG. 3B). The reversed phonemes may correspond with and be converted into a sequence of words, for example, as determined by statistical language models (SLM) applied to N-grams in oldest to newest order. Thus, in the example, the sequence of words may comprise "bring me a water". In another embodiment, reversed phonemes may be converted into a sequence of words determined by reversed SLM applied to N-grams in newest to oldest order. Thus, in this example, the sequence of words may comprise "water a me bring". According to some embodiments, any transcribed words comprising the wakeword and/or parts of the wakeword can be discarded from the sequence of words, to prevent false negative grammar matches (e.g., avoid misrecognizing wakeword as part of command speech).

According to some embodiments, one or more phoneme sequences above a predetermined threshold can be subjected to further calculations, such as by statistical language models or natural language understanding (NLU) models. According to some embodiments, the NLU model is a reversed language model, used to determine intent from matching sequences of reversed words with reversed grammars. Acoustic model processing can be run continuously to transcribe the speech audio (from newest to oldest order) until a grammar is matched (e.g., the command speech, "bring me a water", is recognized by matching with a grammar associated with invoking a computer program operation). According to some embodiments, once the command speech is matched, the pre-command speech may be discarded.

FIG. 3A shows an example forward phonetic dictionary 300 listing of phonemes, using the Carnegie Mellon University's standard English phoneme codes. This is for convenient reference for understanding the following descriptions of phoneme sequences and (forward) ASR. In the example, each English word corresponds to a forward pronunciation (e.g., a forward sequence of phonemes).

FIG. 3B shows an example reverse phonetic dictionary 350 listing of phonemes, using the Carnegie Mellon University's standard English phoneme codes. This is for convenient reference for understanding the following descriptions of phoneme sequences and R-ASR. In the example, each English word corresponds to a reverse pronunciation (e.g., reverse sequence of phonemes).

Figure 4:
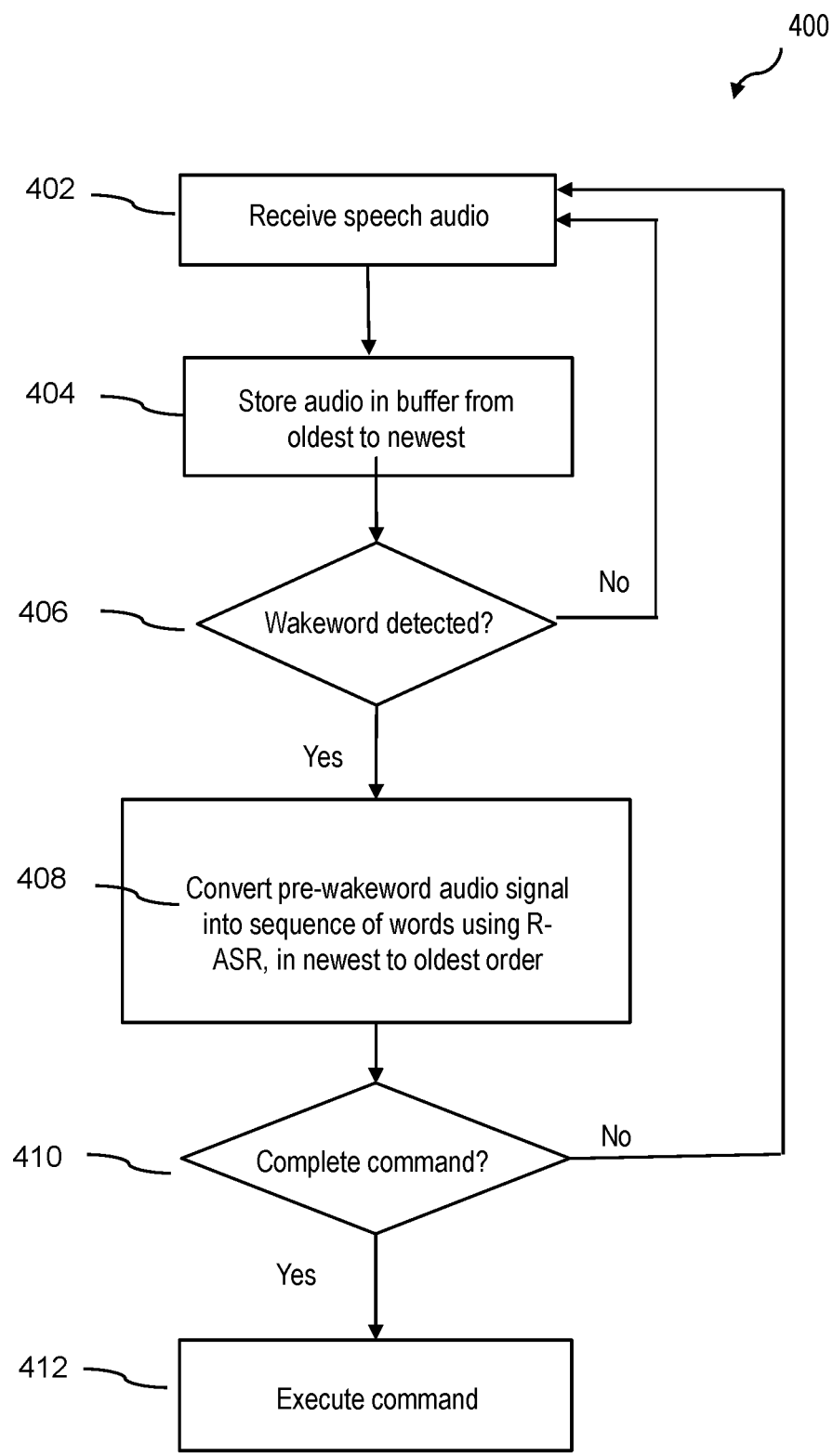
FIG. 4 shows an exemplary process of pre-wakeword speech processing, according to one or more embodiments of the present subject matter.

FIG. 4 shows an exemplary process 400 of pre-wakeword speech processing. At step 402, a pre-wakeword speech processing system can receive speech audio. Speech audio can include a set of spoken words, which comprise pre-wakeword speech followed by a wakeword. The pre-wakeword speech can further comprise pre-command speech (e.g., non-command speech which precedes a command) and command speech. At step 404, the speech audio is stored in a buffer from oldest to newest order. According to some embodiments, the speech audio may be stored in a sequence of spectral frames in the buffer.

At step 406, the system determines whether a wakeword is detected. According to some embodiments, a wakeword spotter may detect the wakeword. According to some embodiments, the wakeword spotter may be a continuous, low accuracy, low power spotter (e.g., that is run on a low power processor). When the wakeword spotter detects a wakeword, or a word substantially similar to a wakeword, a higher power and/or higher accuracy wakeword spotter may review the wakeword and confirm detection of the wakeword. The first (e.g., initial) frame storing the wakeword can be estimated, for example, by identifying the spectral frame that stores the first phoneme of the wakeword.

At step 408, the system converts pre-wakeword audio signal into a sequence of words using R-ASR, from newest to oldest order, starting from before the wakeword (e.g., before an initial buffered audio frame of the wakeword). According to some embodiments, buffered speech audio frames (e.g., spectral frames) are converted (e.g., transcribed) in reverse, resulting in a sequence of reverse phonemes. According to some embodiments, a reverse pronunciation dictionary is used to transcribe the words, and a backwards language model (LM) may be applied in newest to oldest order, using the reverse pronunciation dictionary and the backwards LM to identify the most probable reverse word sequence.

At step 410, the sequence of words may be determined to be a complete command using a NLU model, for example, by applying a natural language grammar model, a neural network (NN) model, a model which can match a string of words with a grammar and interpret it as a complete command, or other model. The complete command can comprise a set of words and/or arrangement of words which correspond to a NLU grammar that is associated with a computer command or a request to invoke a function (e.g., an instruction to a computer program to perform a specific task or operation). Thus, a complete command can be identified when the sequence of words matches a grammar associated with invoking a function, using the NLU model. According to some embodiments, with each transcription of a (reverse) word (e.g., transcribed from newest to oldest order), NLU can be applied to the sequence of words in a forward direction to determine the intent of the sequence of words (e.g., find a complete command). According to some embodiments, a reverse natural language grammar model (e.g., reverse NLU) may be used to match the sequence of words to a backward complete command. That is, the system may find a match to a complete command in reverse (e.g., corresponding to reverse grammars) in a backward direction through the sequence of words, as the sequence of words is transcribed from newest to oldest in the buffered audio frame. When the sequence of words matches the complete command, R-ASR may be terminated.

At step 412, once a complete command is identified, the system can execute the command. Any additional buffered audio before the sequence of words matching the grammar can be ignored and/or discarded. Therefore, if a mid-sentence correction is uttered during a command (e.g., a portion of an original command is spoken, but after or partway through the original command, a corrected command is spoken in completion), the system will recognize only the corrected command before ever reaching the original (e.g., canceled) command speech. For example, a command with a mid-sentence correction may comprise, "What time is it in San Fran-what is the weather in San Francisco?". The system will match the corrected command ("what is the weather in San Francisco") to a grammar associated with a query for the current weather in a specified location, as opposed to a grammar associated with the canceled query for the time in the location. This avoids a false positive match to grammars (e.g., mistakenly recognizing and executing the original, canceled command spoken prior to the corrected command.) According to some embodiments, the system runs the acoustic model and language model (R-ASR) and natural language grammar model (e.g., NLU, reverse NLU) through the buffered audio, in newest to oldest order, until the oldest end of the buffer is reached. According to some embodiments, the acoustic and language models are applied to the buffered speech audio, from newest to oldest order, until a pause is reached. In an embodiment, a pause is a period of no voice activity whose duration exceeds a threshold.

Figure 5:
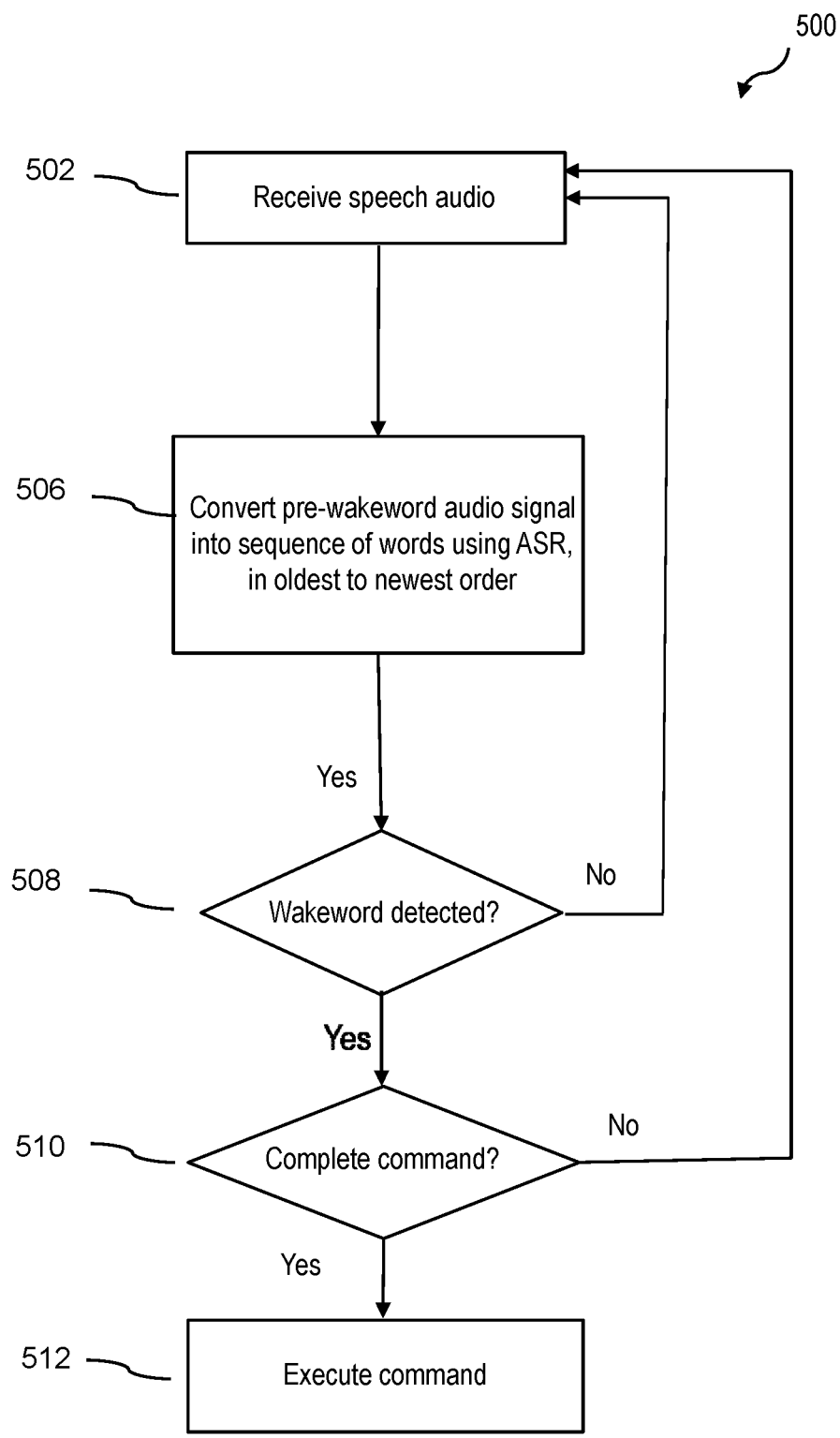
FIG. 5 shows another exemplary process of pre-wakeword speech processing, according to one or more embodiments of the present subject matter.

FIG. 5 shows another exemplary process 500 of pre-wakeword speech processing. At step 502, speech audio, comprising pre-wakeword speech followed by a wakeword, is received. Pre-wakeword speech can comprise command speech, or it can comprise a combination of command speech and non-command speech. According to some embodiments, as the speech audio is being received, the speech audio is immediately transcribed into a sequence of forward words using forward ASR, from oldest to newest order, at step 506. According to some embodiments, the speech audio may be stored in a buffer, for example, in a sequence of spectral frames, prior to transcription.

According to some embodiments, the forward ASR comprises a continually running low powered and/or low accuracy acoustic model. The sequence of forward words (e.g., comprising a sequence of forward phonemes) may be stored, in oldest to newest order, in a phoneme buffer, for example, as a sequence of spectral frames. The frames are converted into a sequence of words using forward ASR, for example, by applying a SLM to N-grams in oldest to newest order. At step 508, when a wakeword is detected, an initial frame of the wakeword can be estimated, for example, by identifying the first frame comprising the first phoneme of the wakeword. A reverse natural language grammar model (e.g., NLU) is applied to the sequence of words (in reverse order, e.g., from newest to oldest order, starting from before the initial frame of the wakeword) until a complete command is found at step 510. A complete command can be found when the sequence of words match an NLU grammar corresponding to all of the words necessary in a command to invoke a computer function. At step 512, the command (e.g., computer function) associated with the complete command is executed.

In another embodiment, the pre-wakeword speech may comprise a first portion of a command, followed by the wakeword, followed by post-wakeword speech comprising a second portion of the command. Thus, a complete command comprises the pre-wakeword speech concatenated with the post-wakeword speech (e.g., uninterrupted by the mid-command wakeword). The audio for the pre-wakeword may be transcribed into a first sequence of forward phonemes and the post-wakeword speech may be transcribed into a second sequence of forward phonemes, using forward ASR, from oldest to newest order, immediately as it is received. A reverse language model can be used to convert the first sequence of phonemes into a first sequence of reversed words, and a forward language model can be used to convert to the second sequence of phonemes into a second sequence of forward words. One of the resulting two sequences of words may be reversed to match the orientation (e.g., forward or backward) of the other sequence, and the sequences are combined. NLU may be applied to the combined sequence until a grammar associated with a complete command is matched.

Figure 6:
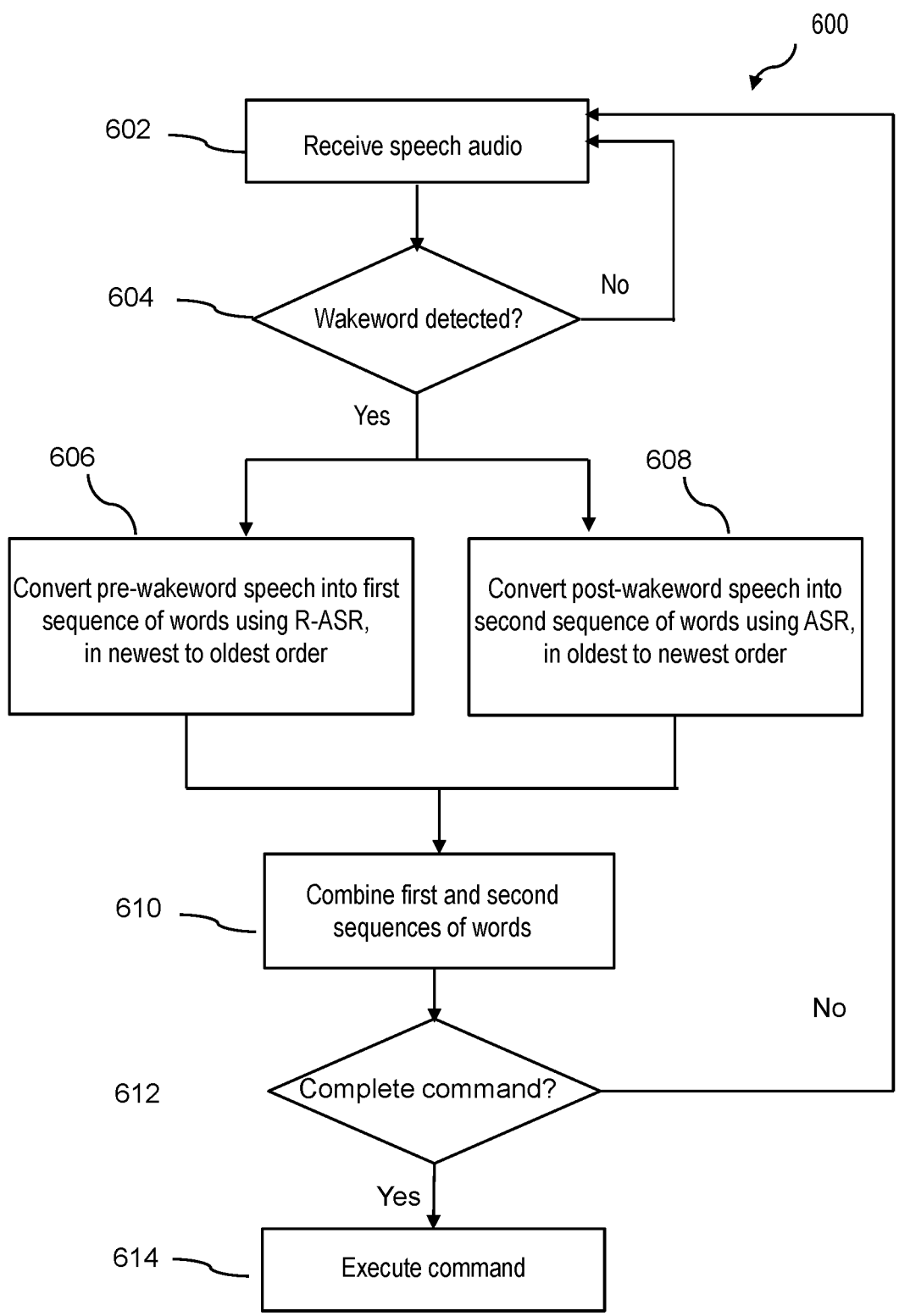
FIG. 6 shows an exemplary process of combined pre-wakeword and post-wakeword speech processing, according to one or more embodiments of the present subject matter.

FIG. 6 shows an exemplary process 600 of combined pre-wakeword and post-wakeword speech processing. At step 602, speech audio comprising speech and a mid-command wakeword is received, for example, "Set a timer, Houndify, for ten minutes." In particular, the speech audio comprises pre-wakeword speech (e.g., a first portion of a command, "set a timer"), followed by a wakeword (e.g., "Houndify"), followed by post-wakeword speech (e.g., a second portion of the command, "for ten minutes"). The speech audio can be stored in a buffer, for example, in a sequence of spectral frames.

When a wakeword is detected at step 604, pre-wakeword speech and post-wakeword speech are converted into sequences of words at steps 606 and 608, respectively. The initial frame and last (e.g., final) frame of the wakeword are estimated, for example, the times at which the wakeword begins and ends in the buffered frames are identified. According to some embodiments, at step 606, system converts frames comprising pre-wakeword audio signal into a first intermediary sequence of (reverse) phonemes using R-ASR, from newest to oldest order, starting from before the wakeword (e.g., before an initial buffered audio frame of the wakeword). In this example, the first sequence of phonemes can comprise the phonemes for the first portion of the command, "set a timer" in reverse, e.g., "ER M AY T AY T EH S". According to some embodiments, a reverse pronunciation dictionary (e.g., see FIG. 3B) is used to transcribe the sequence of phonemes into a sequence of words (e.g., apply reverse SLM to N-grams in newest to oldest order, using a reverse pronunciation dictionary to identify the most probable word). Thus, in this example, the first sequence of words can comprise, "timer a set".

According to some embodiments, at step 608, the system continues to receive speech audio after the wakeword, and it converts the spectral frames comprising post-wakeword audio signal into a second sequence of words using forward ASR, from oldest to newest order, starting from after the wakeword (e.g., after a final buffered audio frame of the wakeword). A last frame (e.g., final frame) of the wakeword may be estimated. In an example, "Houndify" is the wakeword, the wakeword last frame could include the final phoneme of the wakeword, "AY". Forward ASR starts from after the frame comprising "AY" in "Houndify" and toward the post-wakeword speech (e.g., working forward through each word in the audio, "for", "ten", "minutes"). A second intermediary sequence of (forward) phonemes may be produced for the second portion of the command, e.g., "F OHR T EH N M IH N AH T S". A forward pronunciation dictionary, as described in FIG. 3A, can be referenced to transcribe the words, together with a conventional language model (LM) in oldest to newest order to identify the most probable word sequence. Thus, in this example, the second sequence of words can comprise "for ten minutes".

At step 610, the two sequences of words are combined. That is, the first sequence of words is reversed to produce the first portion of the command, and the second sequence of words produces the second portion of the command. The concatenation of the two forward sequences comprises the complete command. For example, the first sequence of words may be reversed into forward order (e.g., from "timer a set" to "set a timer") prior to combining with the second sequence of words ("for ten minutes") to create a complete command "set a timer for ten minutes". The command in its complete structure (e.g., uninterrupted by a mid-command wakeword) can then be determined as a complete command at step 612. A complete command can be determined when the concatenated sequences of words match a grammar associated with invoking a function (e.g., a computer command or operation). According to some embodiments, the pre-wakeword speech can be converted into the first sequence of words using R-ASR backward through the buffer until a point of no voice activity is reached (e.g., indicating the beginning of the utterance). Meanwhile, the words of the second sequence (e.g., converted from post-wakeword speech using forward ASR going through the buffer) can be combined incrementally in real-time, with the first sequence of words until a grammar (e.g., corresponding to a complete command uninterrupted by a mid-command wakeword) is matched. According to some embodiments, the words of the second sequence are combined with the first sequence until an end-of utterance occurs (e.g., a period of no voice activity is detected in at least prior to the first sequence or after the second sequence). Once a complete command is identified, the associated computer command is executed at step 614.

According to some embodiments, processing the pre-wakeword speech using R-ASR and processing the post-wakeword speech using forward ASR can occur in separate simultaneous threads. According to some embodiments, converting the pre-wakeword speech into the first sequence of words using R-ASR can be performed on a high-power processor (e.g., ARM-A series processor, etc.), while converting the post-wakeword speech into the second sequence of words can be performed on a low-power processor (e.g., ARM-M series processor, etc.). Forward processing (e.g., converting the post-wakeword speech into the second sequence using forward ASR) operates incrementally as speech occurs. As long as the processor is capable of real-time processing, forward processing can be performed on the lowest power processor available in the system (such as a Tensilica core or ARM Cortex M-series core). However, pre-wakeword speech needs to be processed as fast as possible, since the command will have finished being spoken and there would be a wait time for a system response otherwise, as soon as the wakeword has finished being uttered. Thus, in some embodiments, pre-wakeword speech processing can be performed on the fastest CPU available in the system. This overall is more energy efficient, and power consumption due to pre-wakeword speech processing can be less than that due to the post-wakeword speech processing. This also avoids the delay in system response to speech having a mid-command wakeword.

Figure 7A:
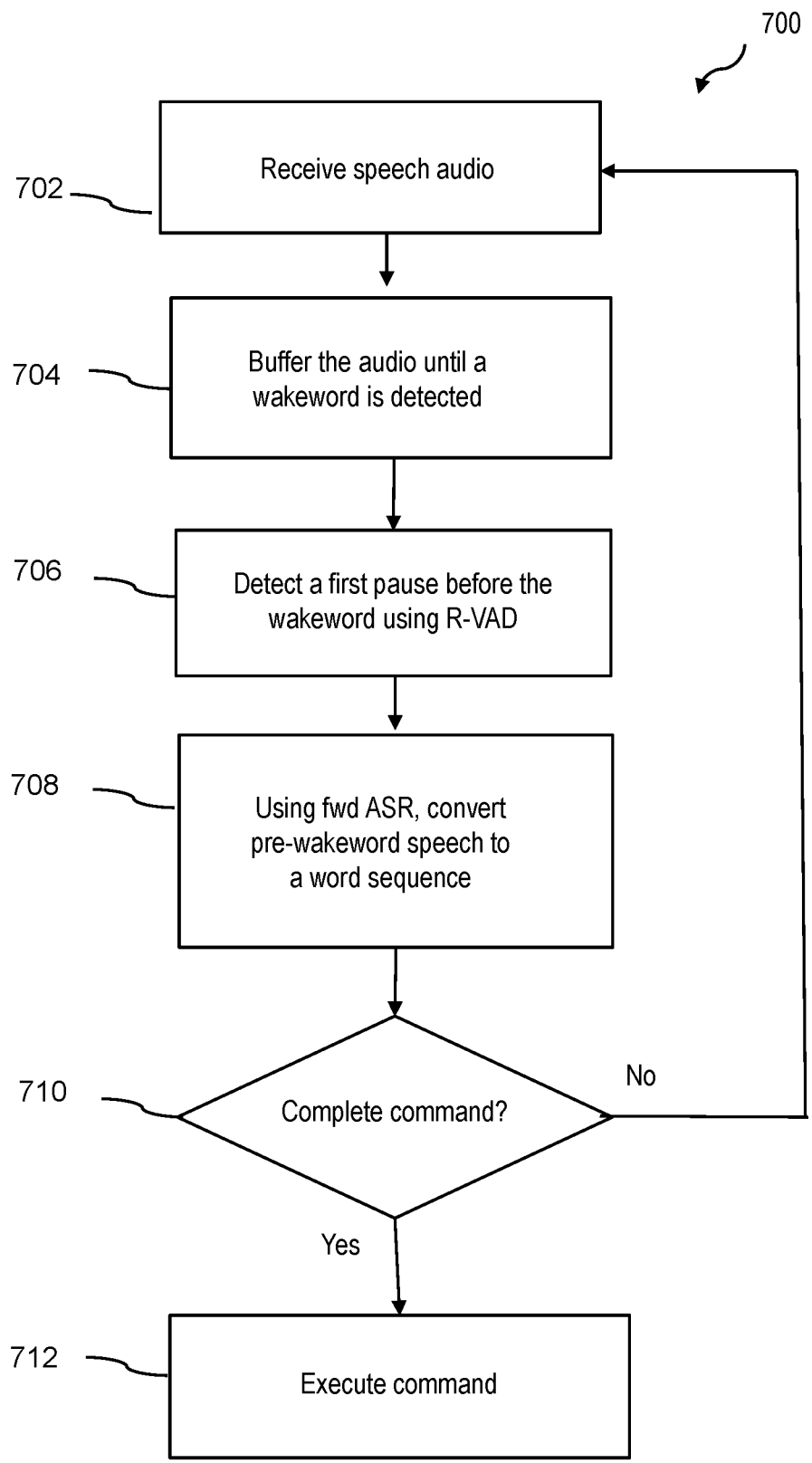
FIG. 7A shows another exemplary process of combined pre-wakeword speech processing, according to one or more embodiments of the present subject matter.

FIG. 7A shows another exemplary process 700 of pre-wakeword speech processing. At step 702, speech audio comprising pre-wakeword speech followed by a wakeword is received. Pre-wakeword speech can further comprise command speech, or a combination of command speech and non-command speech. At step 704, the audio is stored in a buffer until a wakeword is detected. According to some embodiments, the speech audio may be stored in a sequence of spectral frames in the buffer. At step 706, reverse voice activity detection (R-VAD) is applied to the buffered audio, starting from before the wakeword and going from newest to oldest order in the buffered audio until a first pause before the wakeword is detected. The first pause can comprise a period of no voice activity (e.g., whose duration exceeds a threshold), indicating the beginning of pre-wakeword speech. At step 708, starting from after the latest time in the buffer where no voice activity is detected, forward ASR can be applied to convert the pre-wakeword speech into a sequence of words. At step 710 a natural language grammar model (e.g., reverse NLU) is applied to the sequence of words (in reverse order, e.g., from newest to oldest order) until a complete command is found at step 710. A complete command can be found when the sequence of words matches an NLU grammar corresponding to all of the words necessary in a command to invoke a computer function. At step 712, the command (e.g., computer function) associated with the complete command is executed. This algorithm improves efficiency, because VAD (forward or reverse) is more economical computationally than ASR, NLU and its components.

In another embodiment, use of R-VAD may include applying a VAD algorithm on the audio, with the audio processed in reverse order. VAD defines voice activity as audio that is neither silence, nor noise, nor music, and each of these properties can be essentially tested in the same manner in forward and backward directions. In yet another embodiment, R-VAD may be based on a neural network trained on reversed speech (e.g., audio training samples in reverse), with marked regions of voice activity, where clean data is used, as well as augmented data in which varying amounts of noise or music is added during training. This allows R-VAD to operate reliably even at a low signal to noise ratio (SNR).

Figure 7B:
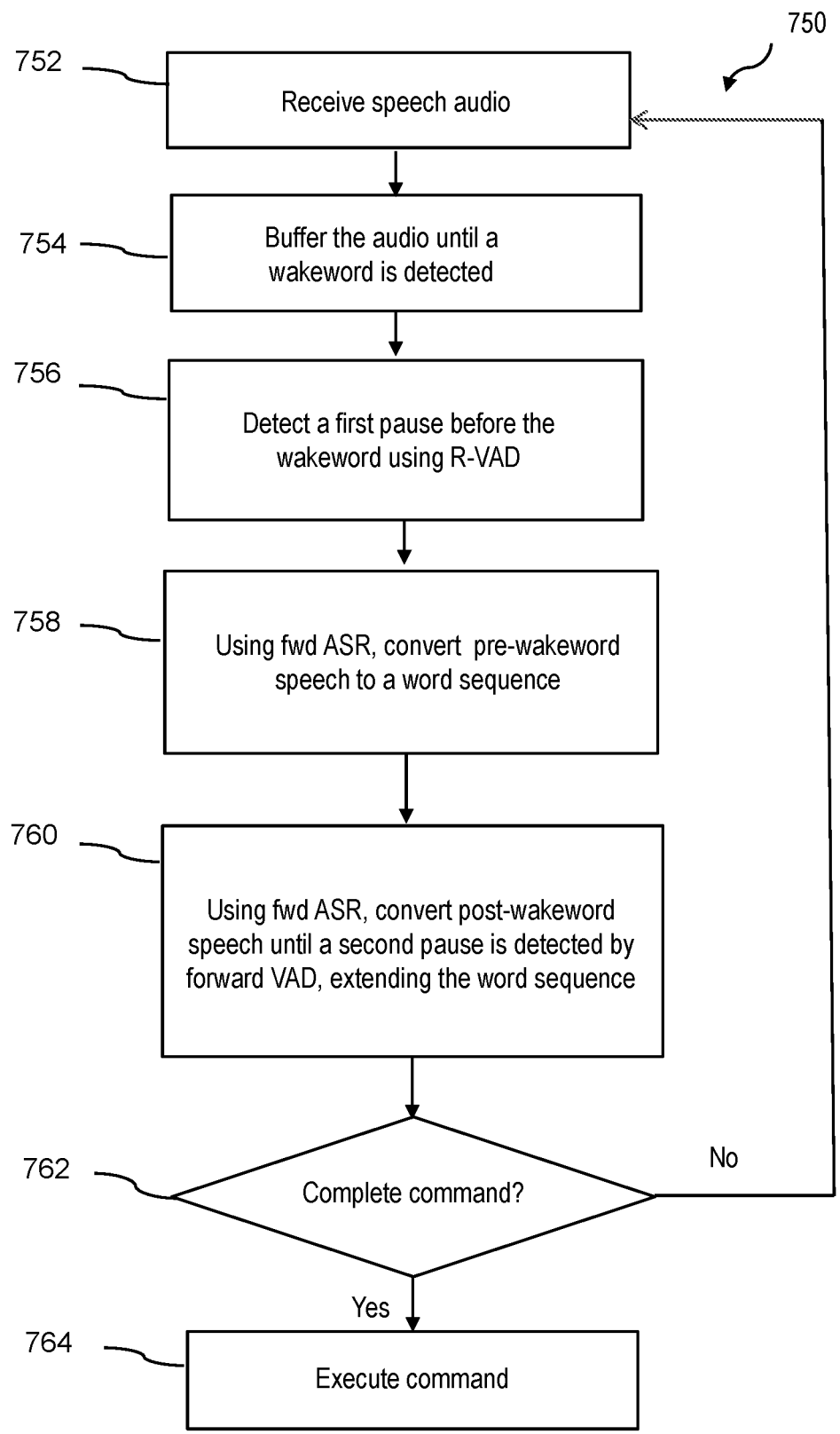
FIG. 7B shows another exemplary process of combined pre-wakeword and post-wakeword speech processing, according to one or more embodiments of the present subject matter.

FIG. 7B shows another exemplary process 750 of combined pre-wakeword and post-wakeword speech processing. At step 752, speech audio comprising pre-wakeword and post-wakeword speech is received. At step 754, the audio is stored in a buffer until a wakeword is detected. At step 756, R-VAD is applied to the buffered audio, starting from before the wakeword and going from newest to oldest order in the buffered audio until a first pause before the wakeword is detected. At step 758, forward ASR is applied to convert the pre-wakeword speech into a sequence of words. At step 760, forward VAD is applied to the audio after the wakeword, and forward ASR is applied to convert the post-wakeword speech, thereby extending the sequence of words. The forward ASR continues until a second pause is detected by forward VAD, at which point ASR can be terminated. The wakeword can be discarded from the extended sequence of words. At step 762, the resulting sequence of words is compared with a NLU model to determine whether the sequence of words comprise a complete command. Once identified, the complete command is executed at step 764.

Figure 8A:
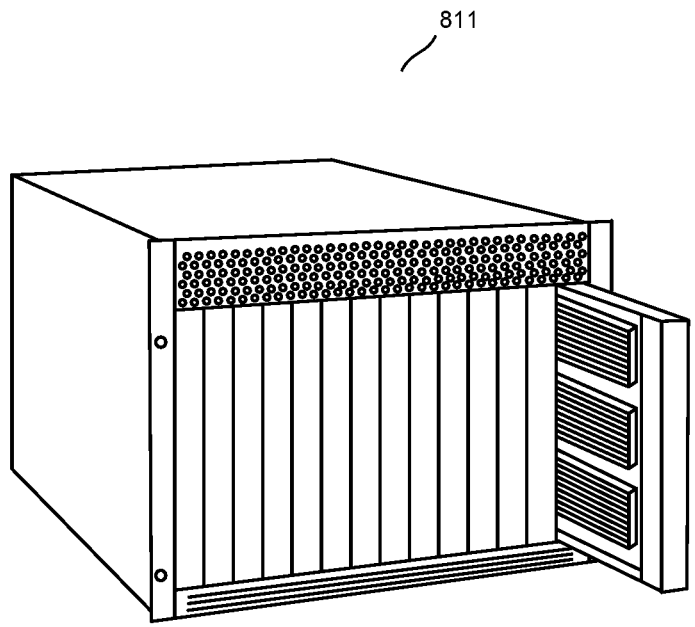
FIG. 8A shows a server system of rack-mounted blades, according to one or more embodiments of the present subject matter.

FIG. 8A shows a server system of rack-mounted blades for implementing the present subject matter. Various examples are implemented with cloud servers, such as ones implemented by data centers with rack-mounted server blades. FIG. 8A shows a rack-mounted server blade multiprocessor server system 811. Server system 811 comprises a multiplicity of network-connected computer processors that run software in parallel.

Figure 8B:
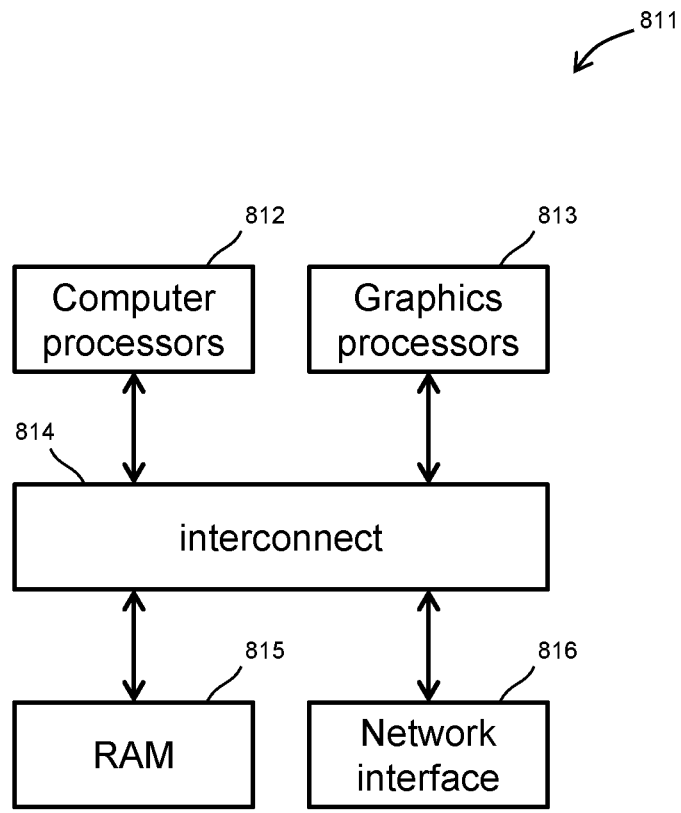
FIG. 8B shows a diagram of a networked data center server, according to one or more embodiments of the present subject matter.

FIG. 8B shows a diagram of a server system 811. It comprises a multicore cluster of computer processors (CPU) 812 and a multicore cluster of the graphics processors (GPU) 813. The processors connect through a board-level interconnect 814 to random-access memory (RAM) devices 815 for program code and data storage. Server system 811 also comprises a network interface 816 to allow the processors to access the Internet, non-volatile storage, and input/output interfaces. By executing instructions stored in RAM devices 815, the CPUs 812 and GPUs 813 perform steps of methods described herein.

Figure 9A:
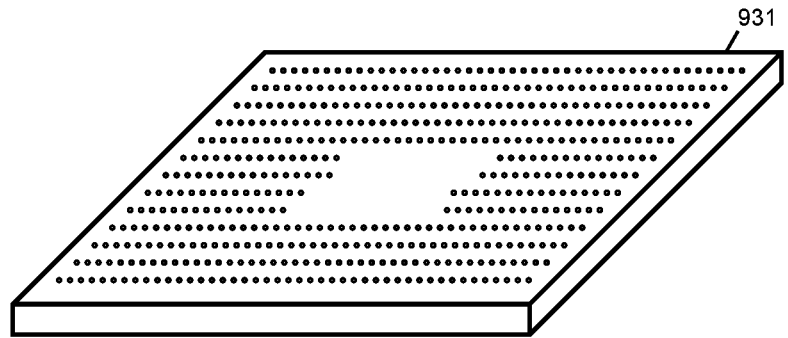
FIG. 9A shows a packaged system-on-chip device, according to one or more embodiments of the present subject matter.

FIG. 9A shows the bottom side of a packaged system-on-chip device 931 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 9B:
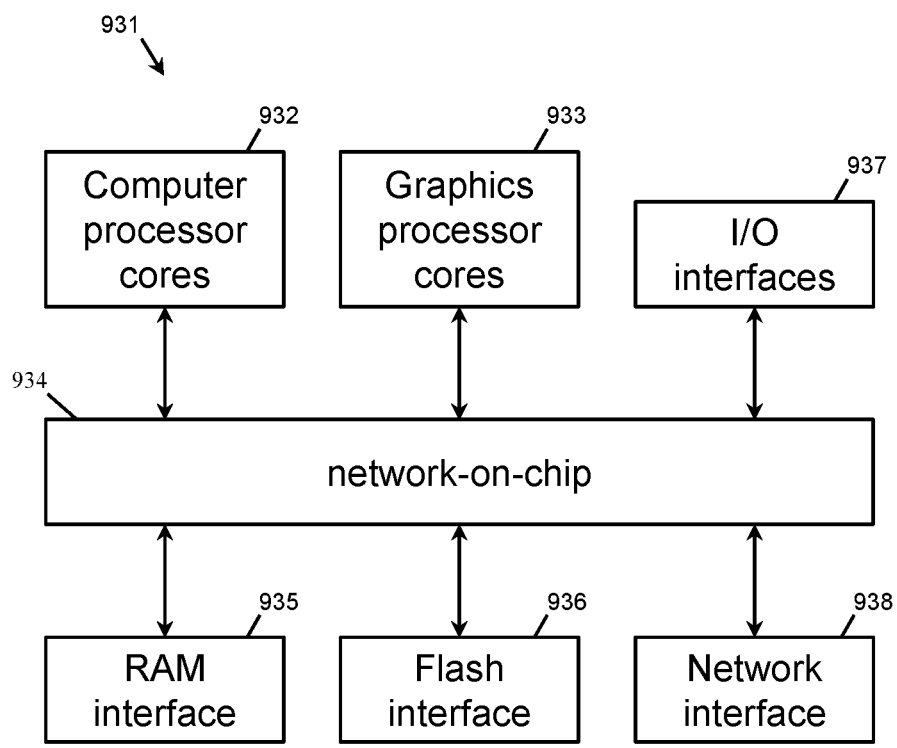
FIG. 9B shows a block diagram of a system-on-chip, according to one or more embodiments of the present subject matter.

FIG. 9B shows a block diagram of the system-on-chip 931. It comprises a multicore cluster of computer processor (CPU) cores 932 and a multicore cluster of graphics processor (GPU) cores 933. The processors connect through a network-on-chip 934 to an off-chip dynamic random access memory (DRAM) interface 935 for volatile program and data storage and a Flash interface 936 for non-volatile storage of computer program code in a Flash RAM non-transitory computer readable medium. SoC 931 also has a display interface for displaying a graphical user interface (GUI) and an I/O interface module 937 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 931 also comprises a network interface 938 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 935 or Flash devices through interface 936, the CPU cores 932 and GPU cores 933 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or ×86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Hardware blocks, custom processor instructions, co-processors, and hardware accelerators perform neural network processing or parts of neural network processing algorithms with especially high performance and power efficiency. This enables extended battery life for battery-powered devices and reduces heat removal costs in data centers that serve many client devices simultaneously.

Certain examples have been described herein, and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof. The scope of the disclosure, therefore, is not intended to be limited to the examples shown and described herein. Rather, the scope and spirit of present invention is embodied by the appended claims.

What is claimed is:

1. A computer-implemented method of recognizing a command spoken before a wakeword, the method comprising:
   receiving an audio signal comprising speech;
   storing the audio signal in a sequence of spectral frames in a buffer;
   detecting a wakeword in the audio signal;
   estimating an initial frame of the wakeword;
   converting a plurality of frames into a sequence of words using reverse automatic speech recognition (R-ASR), in newest to oldest order, beginning from a first frame before the initial frame of the wakeword;
   matching the sequence of words to a complete command;
   identifying a mid-sentence correction between the command and the wakeword, the mid-sentence correction corresponding to words matching a second complete command; and
   invoking a function associated with the second complete command.

2. The computer-implemented method of claim 1, wherein using R-ASR further comprises referencing at least a phonetic dictionary, the phonetic dictionary having reverse pronunciations of words.

3. The computer-implemented method of claim 1, wherein using R-ASR further comprises referencing at least a language model, the language model having reverse orders of word sequences.

4. The computer-implemented method of claim 1, further comprising:
   transforming the audio signal into a sequence of reversed phonemes through R-ASR.

5. The computer-implemented method of claim 1, further comprising:
   terminating R-ASR when the sequence of words matches the complete command.

6. The computer-implemented method of claim 1, further comprising:
   estimating a last frame of the wakeword;
   converting a second plurality of frames into a second sequence of words using automatic speech recognition (ASR) system, in oldest to newest order, beginning from a first frame after the last frame of the wakeword;
   combining the sequence of words and the second sequence of words into a combined sequence of words;
   matching the combined sequence of words to the complete command; and
   invoking the function associated with the complete command.

7. The computer-implemented method of claim 6, wherein using ASR further comprises referencing at least a second phonetic dictionary, the second phonetic dictionary having forward pronunciations of words.

8. The computer-implemented method of claim 6, wherein using ASR further comprises referencing at least a second language model, the second language model having forward orders of word sequences.

9. The computer-implemented method of claim 6, further comprising:
   converting the plurality of frames using R-ASR and converting the second plurality of frames using ASR in separate simultaneous threads.

10. The computer-implemented method of claim 6, further comprising:
    converting the plurality of frames using R-ASR on a high-performance processor; and
    converting the second plurality of frames using ASR on a low-performance processor.

11. The computer-implemented method of claim 1, further comprising:
    detecting a pause in the audio signal; and
    converting the plurality of frames using R-ASR, in newest to oldest order, beginning from the first frame before the initial frame of the wakeword toward the pause.

12. The computer-implemented method of claim 1, wherein the wakeword is a high frequency phrase.

13. A computer-implemented method of recognizing a command, the method comprising:
    receiving an audio signal comprising speech;
    detecting a wakeword in the audio signal;
    estimating a beginning time of the wakeword;
    converting the audio signal into a sequence of words using reverse automatic speech recognition (R-ASR), in newest to oldest order, from before the beginning time of the wakeword;
    matching the sequence of words to a complete command;
    identifying a mid-sentence correction between the command and the wakeword, the mid-sentence correction corresponding to words matching a second complete command; and;
    invoking a function associated with the second complete command.

14. The computer-implemented method of claim 13, wherein using R-ASR further comprises referencing at least a phonetic dictionary, the phonetic dictionary having reverse pronunciations of words.

15. The computer-implemented method of claim 13, wherein using R-ASR further comprises referencing at least a language model, the language model having reverse orders of word sequences.

16. The computer-implemented method of claim 13, further comprising:
    transforming the audio signal into a sequence of reversed phonemes through R-ASR.

17. The computer-implemented method of claim 13, further comprising:

terminating R-ASR when the sequence of words matches the complete command.

18. The computer-implemented method of claim 13, further comprising:

estimating a last frame of the wakeword;

converting a second plurality of frames into a second sequence of words using automatic speech recognition (ASR) system, in oldest to newest order, beginning from a first frame after the last frame of the wakeword;

combining the sequence of words and the second sequence of words into a combined sequence of words;

matching the combined sequence of words to the complete command; and invoking the function associated with the complete command.

19. The computer-implemented method of claim 13, wherein using ASR further comprises referencing at least a second phonetic dictionary, the second phonetic dictionary having forward pronunciations of words.

20. The computer-implemented method of claim 13, wherein using ASR further comprises referencing at least a second language model, the second language model having forward orders of word sequences.

\* \* \* \* \*